(12) United States Patent
Kang

(10) Patent No.: US 11,577,172 B2
(45) Date of Patent: Feb. 14, 2023

(54) DEVICE, METHOD, AND COMPUTER PROGRAM FOR PROVIDING GAME SERVICE

(71) Applicant: NEXON KOREA CORPORATION, Seongnam-si (KR)

(72) Inventor: Dae Hyun Kang, Seongnam-si (KR)

(73) Assignee: NEXON KOREA CORPORATION, Seongnam-si (KR)

( * ) Notice: Subject to any disclaimer, the term of this patent is extended or adjusted under 35 U.S.C. 154(b) by 0 days.

(21) Appl. No.: 16/766,202

(22) PCT Filed: Feb. 6, 2018

(86) PCT No.: PCT/KR2018/001562
§ 371 (c)(1),
(2) Date: May 21, 2020

(87) PCT Pub. No.: WO2019/103239
PCT Pub. Date: May 31, 2019

(65) Prior Publication Data
US 2020/0368626 A1    Nov. 26, 2020

(30) Foreign Application Priority Data

Nov. 23, 2017    (KR) .......................... 10-2017-0157501

(51) Int. Cl.
*A63F 13/00* (2014.01)
*A63F 13/795* (2014.01)
(Continued)

(52) U.S. Cl.
CPC ............ *A63F 13/795* (2014.09); *A63F 13/48* (2014.09); *A63F 13/87* (2014.09); *A63F 2300/572* (2013.01)

(58) Field of Classification Search
CPC .... A63F 13/795; A63F 13/335; A63F 13/847; A63F 2300/802
See application file for complete search history.

(56) References Cited

U.S. PATENT DOCUMENTS

| 10,477,336 B2* | 11/2019 | Kimura | ..................... H04S 1/00 |
| 2007/0218997 A1* | 9/2007 | Cho | ..................... A63F 13/795 |
| | | | 463/42 |

(Continued)

FOREIGN PATENT DOCUMENTS

| JP | 2003-033577 A | 2/2003 |
| JP | 2008-207005 A | 9/2008 |

(Continued)

OTHER PUBLICATIONS

International Search Report and Written Opinion for PCT/KR2018/001562 dated Aug. 22, 2018, all pages.

*Primary Examiner* — David L Lewis
*Assistant Examiner* — Eric M Thomas
(74) *Attorney, Agent, or Firm* — Kilpatrick Townsend & Stockton LLP

(57) ABSTRACT

A method of enabling a user to play a game with a virtual friend includes determining a virtual friend having first feature information on the basis of user information, determining a message from the virtual friend to be transmitted to the user on a basis of the user information and the first feature information, transmitting the message to the user; and when the user who has received the message accesses a game, transmitting an invitation message from the virtual friend to the user within the game.

22 Claims, 15 Drawing Sheets

(51) Int. Cl.
*A63F 13/48* (2014.01)
*A63F 13/87* (2014.01)

(56) References Cited

U.S. PATENT DOCUMENTS

| | | | | |
|---|---|---|---|---|
| 2008/0153596 | A1* | 6/2008 | Nguyen | A63F 13/12 |
| | | | | 463/42 |
| 2009/0325712 | A1* | 12/2009 | Rance | A63F 13/795 |
| | | | | 463/42 |
| 2011/0107239 | A1* | 5/2011 | Adoni | A63F 13/12 |
| | | | | 726/8 |

FOREIGN PATENT DOCUMENTS

| | | |
|---|---|---|
| JP | 2013-059564 A | 4/2013 |
| KR | 10-2003-0037466 A | 5/2003 |
| KR | 10-2005-0114773 A | 12/2005 |
| KR | 10-2014-0016785 A | 2/2014 |
| KR | 10-2016-0129472 A | 11/2016 |
| KR | 10-2017-0051073 A | 5/2017 |
| WO | 2005/059761 A1 | 6/2005 |

* cited by examiner

DEVICE, METHOD, AND COMPUTER PROGRAM FOR PROVIDING GAME SERVICE

TECHNICAL FIELD

The disclosure relates to a device, method, and computer program for providing a game service, and more particularly, to a device, method, and computer program for providing a game service which supports an environment in which a user plays a game with a virtual friend.

BACKGROUND ART

A user may play an online game by installing a program for running the game on a user device including various wired/wireless communication devices such as a personal computer, a smart phone, or tablet PCs. The number of users who enjoy games regardless of space and time constraints by using mobile communication devices, in addition to PCs, has increased.

Game service providers tend to send advertisement messages through user's messenger, mobile messenger, or text messages of users to encourage users to participate in games.

When a user is not able to play a game with a friend, the user may play the game with a computer, for example, artificial intelligence. In this case, as it is different from playing a game with a real friend, the user may feel bored and thus often stop using a game service.

DESCRIPTION OF EMBODIMENTS

Technical Problem

When a user plays with a virtual friend having a predetermined character, it becomes more interesting than playing alone, so that the user may play more continuously. In addition, as the virtual friend sends a message to invite a user to a match or to guide the user to play together, the virtual friend may appear like a real friend.

Solution to Problem

According to an embodiment, a method of enabling a user to play a game with a virtual friend includes determining a virtual friend having first feature information, determining a message from the virtual friend to be transmitted to the user on a basis of the first feature information, transmitting the message to the user, and when the user who has received the message accesses a game, transmitting an invitation message from the virtual friend to the user within the game.

According to an embodiment, the determining of the virtual friend may include determining the virtual friend having the first feature information on the basis of user information.

According to an embodiment, the user information may include at least one of game access information, play performance, attack point information, growth information, used item information, obtained item information, level information, completed achievement information, achieved quest information, skill information, operation ability information, friend information, or guild information.

According to an embodiment, the determining of the virtual friend having the first feature information may include determining the virtual friend having the first feature information on a basis of user information and game statistics information, and the game statistics information may include at least one of statistics information of a new user in a game test version, statistics information of the new user in a cross game, and statistics information of a plurality of other users for a certain period or for a certain game play frequency in a game.

According to an embodiment, the determining of the virtual friend having the first feature information may include determining the first virtual friend having the first feature information and a second virtual friend having second feature information on a basis of user information.

According to an embodiment, the determining of the virtual friend having the first feature information may include determining the virtual friend by using a first model set for determining the first feature information of the virtual friend, and the first model may be a model generated by training user information by using an artificial intelligence algorithm.

According to an embodiment, the first model may be a model generated by training, by using an artificial intelligence algorithm, the user information and information about whether the user and the virtual friend play a game in response to the transmission of the invitation message.

According to an embodiment, the determining of the virtual friend having the first feature information may include selecting at least one virtual friend from among virtual friends included in a user's friend list on a basis of user information.

According to an embodiment, the determining of the message from the virtual friend to be transmitted to the user on a basis of the first feature information may include determining a message requesting a match with the user on a basis of user information and the first feature information.

According to an embodiment, the determining of the message from the virtual friend to be transmitted to the user on a basis of the first feature information may include determining the message by using a second model set for determining the message, and the second model is a model generated by training user information and the first feature information by using an artificial intelligence algorithm.

According to an embodiment, the second model is a model generated by training, by using an artificial intelligence algorithm, the user information, the first feature information, and information about whether the user and the virtual friend play a game in response to the transmission of the invitation message.

According to an embodiment, the transmitting of the message to the user may include transmitting the message to the user at a time determined on a basis of user information and the first feature information.

According to an embodiment, the method may further include controlling the virtual friend having the first feature information and the user to play the game in response to the invitation message from the virtual friend.

According to an embodiment, a device for enabling a user to play a game with a virtual friend includes a memory, a processor, and a communication unit, wherein the processor is configured to determine a virtual friend having first feature information, determine a message from the virtual friend to be transmitted to the user on a basis of the first feature information, transmit the message to the user, and when the user who has received the message accesses a game, transmit the invitation message from a virtual friend to the user within the game.

According to an embodiment, the processor may determine the virtual friend having the first feature information on a basis of user information.

According to an embodiment, the processor may determine the virtual friend having the first feature information on a basis of user information and game statistics information, and the game statistics information may include at least one of statistics information of a new user in a game test version, statistics information of the new user in a cross game, and statistics information of a plurality of other users for a certain period or for a certain game play frequency in a game.

According to an embodiment, the processor may determine the first virtual friend having the first feature information and a second virtual friend having the second feature information on a basis of user information.

According to an embodiment, the processor may determine the virtual friend by using a first model set for determining the first feature information of the virtual friend, and the first model may be a model generated by training user information by using an artificial intelligence algorithm.

According to an embodiment, the processor may select at least one virtual friend from among virtual friends included in a user's friend list on a basis of user information.

According to an embodiment, the processor may determine a message requesting a match with the user on a basis of user information and the first feature information.

According to an embodiment, the processor may determine the message by using a second model set for determining the message, and the second model may be a model generated by training user information and the first feature information by using an artificial intelligence algorithm.

According to an embodiment, the processor may transmit the message to the user at a time determined on a basis of user information and the first feature information.

According to an embodiment, the processor may control the virtual friend having the first feature information and the user to play the game in response to the invitation message from the virtual friend.

According to an embodiment, a method of enabling a user to play a game with a virtual friend is stored in the form of a computer program stored in a computer-readable medium and executed thereon.

Advantageous Effects of Disclosure

When a user plays with a virtual friend having a predetermined character, the user becomes more interested than playing alone so as to play more continuously. Furthermore, the user plays a game again with a virtual friend who previously played the game together, the user may become more interested.

In addition, as the virtual friend sends a message to invite the user to a match or to guide the user to play together, the user may have a desire of winning so as to participate in the game.

When the user completes a match with the virtual friend or adds the virtual friend to a friend list, the user may be appropriately rewarded so as to increase the interest in the game.

Furthermore, as the virtual friend is allowed to have the characteristics determined through user information and to provide appropriate advice on the user's game play, the user may feel like playing against a real friend.

MODE OF DISCLOSURE

Figure 1:
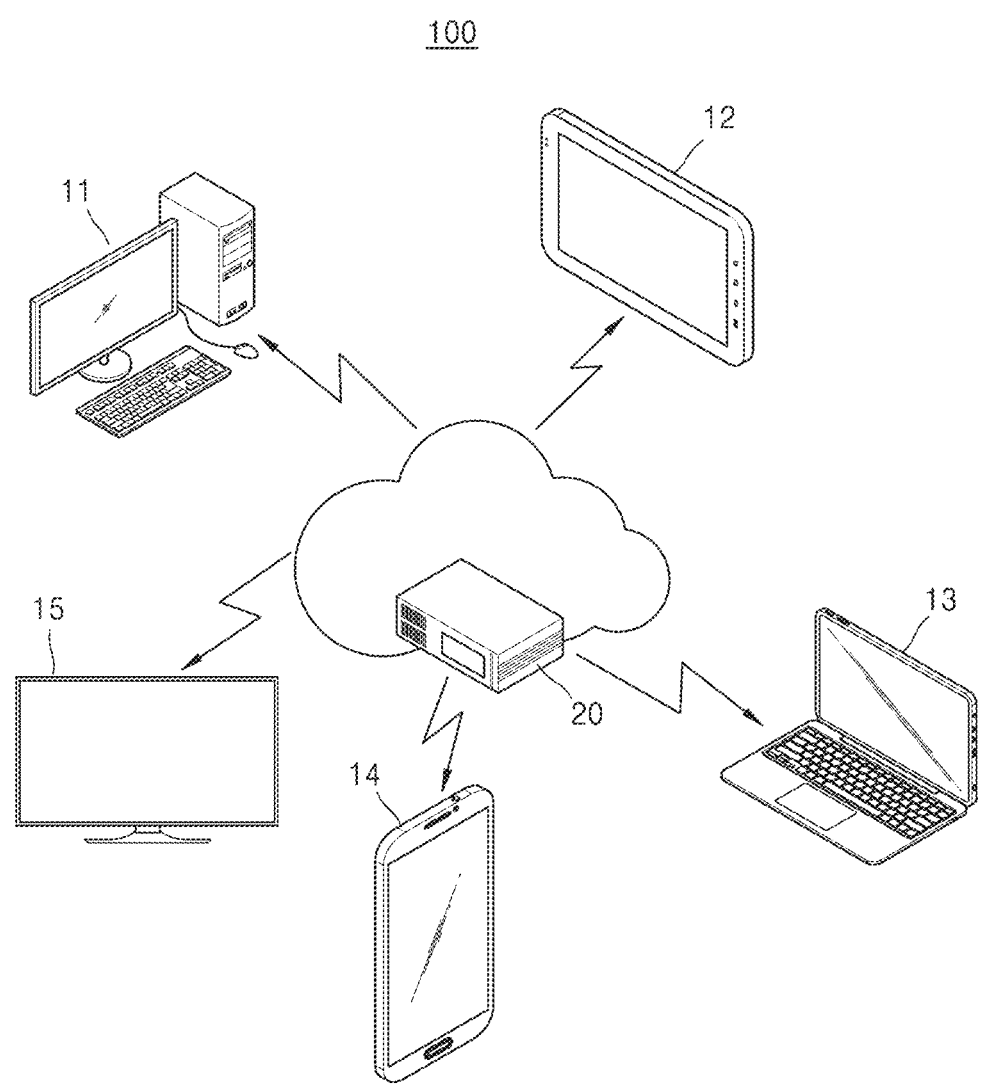
FIG. 1 illustrates an online game providing system 100 including a user device and a server, according to an embodiment.

The disclosure will now be described more fully with reference to the accompanying drawings, in which embodiments of the disclosure are shown. Furthermore, a method forming and using an electronic device According to an embodiment, of the disclosure is described in detail with reference to the accompanying drawings. In the drawings, like reference numerals or signs in each drawing denote like parts or elements performing substantially the same function.

Terms including the ordinal number such as first or second may be used for describing various constituent elements, but the disclosure is not limited by the terms. The above terms are used only to distinguish one component from another. For example, without departing from the right scope of the disclosure, a first constituent element may be referred to as a second constituent element, and vice versa. As used herein, the term "and/or" includes any and all combinations of one or more of the associated listed items.

The terms used in the specification, are merely used to describe particular embodiments, and are not intended to limit the disclosure. An expression used in the singular encompasses the expression of the plural, unless it has a clearly different meaning in the context. In the specification, it is to be understood that terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

In the specification, when a constituent element "connects" or is "connected" to another constituent element, the constituent element contacts or is connected to the other constituent element not only directly, but also electrically through at least one of other constituent elements interposed therebetween. Also, when a part may "include" a certain constituent element, unless specified otherwise, it may not be construed to exclude another constituent element but may be construed to further include other constituent elements. Furthermore, terms such as " . . . unit", " . . . module", etc. stated in the specification, may signify a unit to process at least one function or operation and the unit may be embodied by hardware, software, or a combination of hardware and software.

In the specification below, a game progress mode may mean a game progress difficulty, a game progress step, for example, stage selection, a used item during a game progress, or a tutorial progress, but the disclosure is not limited thereto.

In the specification below, game statistics information may mean information obtained by analyzing data in a game for a certain period by various standards regarding the game. For example, the game statistics information may be obtained by analyzing user information in a game.

The user information may include at least one of game access information, play performance, attack point information, growth information, used item information, obtained item information, level information, completed achievement information, achieved quest information, skill information, operation ability information, friend information, or guild information. Furthermore, the user information may be an interpretation of many pieces of data such as a group to which a character possessed by a user belongs, an individual skill, a speed, a damage amount, physical strength, an attack participation degree, a defense participation degree, an accumulated wealth amount, a user's accumulated game time, a used item type, and a level, on the basis of certain standards.

Furthermore, the game statistics information may include game statistics information about a user and game statistics information about other users. Furthermore, the game statistics information may include not only game statistics information about the game, but also game statistics information about a test version of the game and statistics information about a cross game.

In the specification, the game statistics information may further include information about at least one of play time, a winning percentage, wearing item information, or a quest completion frequency, but the disclosure is not limited thereto.

In the specification below, the attack point information may include information about kill, death, goal, and assists, which varies game by game, but the disclosure is not limited thereto. The growth information may include information about a play time, a level up, a degree of wealth, a quest clear frequency, etc., but the disclosure is not limited thereto.

In the specification below, the cross game may mean at least one of a game classified to be in the same genre or other game service identical to a certain game provided by a game service provider, but the disclosure is not limited thereto.

In the specification below, a game test version is a version for test before official release of a game and may include a closed beta, an open beta version, or an alpha version, but the disclosure is not limited thereto and the game test version may mean all versions for a test among game versions.

In the specification below, the operation ability information may include information about a user's ability to operate an interface to control a character. For example, the operation ability information may include information about user's ability to control the movement of a character, for example, instantaneous power and accuracy. The operation ability information may include at least one of recognition ability of a user interface or operation ability of a user interface, but the disclosure is not limited thereto.

In the specification below, the recognition ability of a user interface may mean user ability to recognize usage of buttons by referring to the shape or layout of the buttons, but the disclosure is not limited thereto.

In the specification below, the operation ability of a user interface, which is an ability regarding how fast a user can control a character by using an interface, may include, for example, information about how fast and accurately a user aims by using a mouse, how accurately a user clicks a button, and how fast a user clicks a button, but the disclosure is not limited thereto.

In the specification below, the game skill, which is information about how much a user is accustomed to a game, may mean quality, a level, ability, or grade of a user who plays a game, but the disclosure is not limited thereto.

In the specification below, a tutorial is a step for providing a new user with knowledge needed for playing a game, and may mean control directions provided for an overall understanding of a game configuration, a description about a battle, and an opportunity to practice. In general, a new user is provided with a tutorial opportunity.

In the specification, a quest, or a request or a mission, may mean a mission provided within a game. In other words, the quest may mean an action to achieve a goal given in a game. For example, a user may obtain a quest of "Exploring a bat cave" in a game. Each quest may have a different difficulty, and the character of a user may obtain experience, property, or items according to the success of a quest or may lose part of the experience, property, or items possessed by the character according to the failure of a quest.

In the specification below, the item may include all of an object, a product, or a content, and may mean equipment such as weapon, armor, clothes, or crystal worn by the characters in a game, vehicles on which the characters boards in a game, consumables such as food or portion, an experience value, or buffs, which may include all digital contents or cyber objects that a user obtains in a game, but the disclosure is not limited thereto.

In the specification below, feature information of a character may include at least one of the type of a character, the level of a character, the appearance of a character, the clothes of a character, the gender of a character, the equipment that a character possesses, or equipment currently worn by a character.

In the specification below, a job or a class may mean a classification according to the ability of a user character that a user may select during a game progress.

In the specification below, a skill tree may mean information about a combination of skills that are usable according to a job or a class and information about a growth order of skills.

In the specification below, a party may mean that at least one user character forms one group in a game and performs an activity together, which is obvious to a person skilled in the art and thus a detailed description thereof is omitted. Like the party, a club or a guild also means that at least one user character forms one group within a game and performs an activity together, which is classified by the number of characters that form a temporary or permanent group, and is also obvious to a person skilled in the art and thus a detailed description thereof is omitted.

In the specification below, the user may mean a user or a gamer and a new user may mean a user who has never played a certain game, which is used as a concept to be distinguished from an existing user, but the disclosure is not limited thereto.

FIG. 1 illustrates an online game providing system 100 including a user device and a server, according to an embodiment.

The online game providing system 100 according to the disclosure may include a server 20 and at least one of user devices 11 to 15. The server 20 may provide an online game service through a network. The server 20 may provide an online game simultaneously to the at least one of the user devices 11 to 15, and the online game may mean a game that a plurality of users enjoy by accessing a network.

According to an embodiment, the server 20 may include a single server, a set of servers, or a cloud server, but the disclosure is not limited thereto. Furthermore, the server 20 may include a database that stores user data.

The at least one of the user devices 11 to 15, which is an electronic device capable of installing and operating a game, may be a device capable of communicating with the server 20 through a network. The at least one of the user devices 11 to 15 may include various electronic devices such as not only a personal computer 11, a tablet 12, a notebook computer 13, a smartphone 14, a TV 15, but also personal digital assistants (PDAs), portable multimedia players (PMPs), navigation devices, MP3 players, digital cameras, refrigerators, washing machines, or vacuum cleaners. Furthermore, the at least one of the user devices 11 to 15, which is not limited thereto, may include a wearable device having a communication function and a data processing function.

The at least one of the user devices 11 to 15 may receive a game service through the server 20 by using a network. Receiving a game service by using a network may mean that a communication between a game server and a terminal is performed by various communication methods.

According to an embodiment, a network may mean a connection established or formed by using a certain communication method, and may mean a communication network for transceiving data between terminals or between a terminal and a server.

The communication method may include a communication method such as a communication through a certain communication standard, a certain frequency range, a certain protocol, or certain channel. For example, the communication method may include all communication methods through Bluetooth, BLE, Wi-Fi, Zigbee, 3G, LTE, or ultrasound, and further a short range communication, a long distance communication, a wireless communication, and a wired communication, but the disclosure is not limited thereto.

According to an embodiment, the short range communication method may mean a communication method in which a communication is possible only when a device, which is a terminal or a server, performing a communication is within a certain range, and may include, for example, Bluetooth or NFC. The long distance communication method may mean a communication method in which a device performing a communication is capable of communicating regardless of a distance. For example, the long distance communication method may mean a method in which two devices performing a communication through a repeater such as an AP, are capable of communicating with each other, when spaced apart from each other over a certain distance, and may include a communication method using a cellular network (3G, LTE) such as an SMS or a phone, but the disclosure is not limited thereto.

According to an embodiment, the online game may include various genres, for example, sports, MMORPG, AOS, FPS, TCG, or CCG. Furthermore, the online game may be a game of a user vs. user match type or a user vs. computer, for example, artificial intelligence, match type. The disclosure is not limited to the above example, and the type of an online game is limitless.

According to an embodiment, the server 20 may include a function of determining a virtual friend and a message from the virtual friend and transmitting a determined message to a user.

Figure 2:
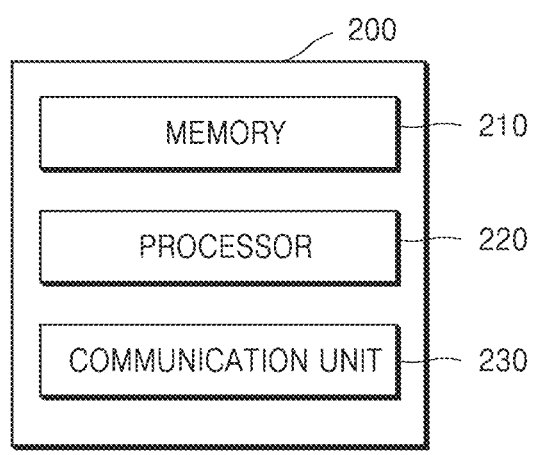
FIG. 2 illustrates a game service providing server 200 according to an embodiment.

FIG. 2 illustrates a game service providing server 200 according to an embodiment.

The game service providing server 200 may be a server device for providing a game service. Furthermore, the game service providing server 200 may be a server device for providing a game service that supports a function of enabling a user to play a game with a virtual friend.

The game service providing server 200 may obtain user information from a database (not shown).

According to an embodiment, the database may store and manage information about a user who plays a game. According to an embodiment, the database may store at least one of user information for example, game access information, play performance, attack point information, growth information, used item information, obtained item information, level information, completed achievement information, achieved quest information, skill information, operation ability information, friend information, or guild information. According to an embodiment, the database may be included in the game service providing server 200.

According to an embodiment, a memory 210 may store various pieces of data, programs, or applications for driving and controlling the game service providing server 200. A program stored in the memory 210 may include one or more instructions. The program (one or more instructions) or applications stored in the memory 210 may be executed by a processor 220.

The processor 220 may control an overall operation of the game service providing server 200. For example, the processor 220 may control an operation of the game service providing server 200 by executing the program stored in the memory 210 of the game service providing server 200.

The processor 220 may provide a function of driving a game. For example, the processor 220 may perform a function of generating contents to be provided within a game. The function of generating contents may be performed by executing program codes stored in the game service providing server 200. The program codes stored in the game service providing server 200 may be updated by a manufacturer.

According to an embodiment, the processor 220 may execute the one or more programs stored in the memory 210. The processor 220 may include a single core, a dual core, a triple core, a quad core, and cores of a multiple thereof. Furthermore, the processor 220 may include a plurality of processors.

According to an embodiment, the processor 220 may determine a virtual friend having first feature information. Furthermore, the processor 220 may determine a virtual friend having the first feature information on the basis of the user information.

Furthermore, the processor 220 may determine a message sent by a virtual friend to a user on the basis of the first feature information and transmit the message to the user. Furthermore, the processor 220 may determine a message sent by a virtual friend to a user on the basis of the user information and the first feature information and transmit the message to the user.

According to an embodiment, the user information may include at least one of game access information, play performance, attack point information, used item information, obtained item information, level information, completed achievement information, achieved quest information, skill information, operation ability information, friend information, or guild information.

The virtual friend may be a friend having a virtual personality generated by the game service providing server 200. The virtual friend may play a game with a user and may be capable of daily conversation and giving advice regarding a game such that the user may feel as if he/she plays a game with an actual friend.

The first feature information of a virtual friend may be similar to the user information. For example, the first feature information of a virtual friend may include at least one of game access information, play performance, attack point information, growth information, used item information, obtained item information, level information, completed achievement information, achieved quest information, skill information, operation ability information, or friend information. Furthermore, the first feature information may further include an individual skill, a speed, a damage amount, physical strength, an attack participation degree, a defense participation degree, an accumulated wealth amount, accumulated game time, or a used item type. Furthermore, the first feature information may further include a way that a virtual friend usually speaks or personality of a virtual friend.

According to an embodiment, when a user who has received a message accesses a game, the processor 220 may control such that a virtual friend transmits, within a game, an invitation message to the user.

The processor 220 may determine a virtual friend having the first feature information on the basis of the user information and the game statistics information.

According to an embodiment, the game statistics information may include at least one of statistics information of a new user in a game test version, statistics information of the new user in a cross game, or statistics information of a plurality of other users for a certain period or for a certain game play frequency in a game.

The processor 220 may determine a plurality of virtual friends on the basis of the user information. A first virtual friend having the first feature information and a second virtual friend having the second feature information may be determined on the basis of the user information.

The processor 220 may determine a virtual friend by using the first feature information of a virtual friend or a first model set to determine a virtual friend having the first feature information.

The first model may be a model generated by training user information by using an artificial intelligence algorithm.

Furthermore, a first model may be a model generated by training, by using an artificial intelligence algorithm, user information and information about whether a user accessed a game in response to the transmission of an invitation message or whether the user played a game with a virtual friend in response to the transmission of an invitation message.

The processor 220 may select at least one virtual friend from among virtual friends included in a user's friend list. For example, the processor 220 may select at least one virtual friend from among virtual friends included in a user's friend list on the basis of the user information.

The processor 220 may determine a message to invite a user to a match on the basis of the user information and the first feature information.

The processor 220 may determine a message by using a second model set to determine a message.

The second model may be a model generated by training the user information and the first feature information by using an artificial intelligence algorithm.

Furthermore, according to an embodiment, the second model may be a model generated by training, by using an artificial intelligence algorithm, the user information, the first feature information, and information about whether a user and a virtual friend play a game in response to the transmission of the invitation message.

The processor 220 may transmit to a user a message at a time determined on the basis of the user information and the first feature information.

The processor 220 may control a virtual friend having the first feature information and a user to play a game in response to the transmission of an invitation message from a virtual friend.

A communication unit 230 may transceive data or signals via a network with respect to the user devices 11 to 15 of FIG. 1 and the database under the control of the processor 220.

The communication unit 230 may communicate with a user device by using at least one of a wireless communication or a wired communication. According to an embodiment, the communication unit 230 may communicate with a user device to provide a user with the contents determined during a game play under the control of the processor 220. Furthermore, the communication unit 230 may receive user information of a user who plays a game from the database (not shown) under the control of the processor 220. The communication unit 230 may receive, from a user device, user information of a user who plays a game, under the control of the processor 220.

The communication unit 230 may transmit, for example, under the control of the processor 220, a message from a virtual friend to a user device to play a game. Furthermore, the communication unit 230 may transmit, under the control of the processor 220, an invitation message from a virtual friend to a user device, and receive from the user device a response to the invitation by the virtual friend.

The communication unit 230 may include a hardware module such as a network interface card, a network interface chip, and a network interface port, and a software module such as a network device driver or a networking program.

The game service providing server 200 may include more constituent elements than those of FIG. 2.

Figure 3:
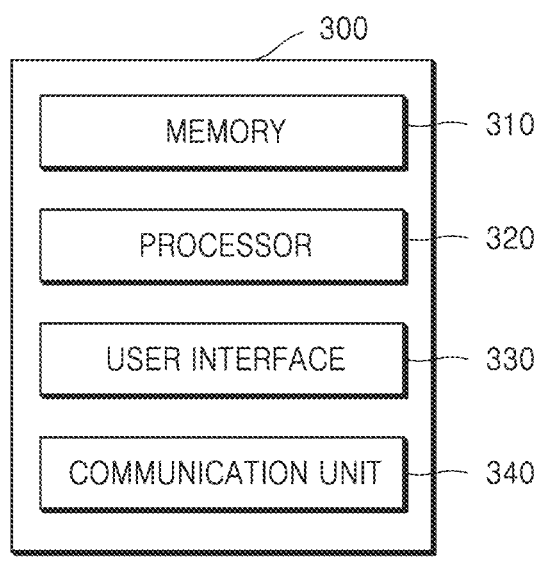
FIG. 3 illustrates a detailed configuration of a user device 300 according to an embodiment.

FIG. 3 illustrates a detailed configuration of a user device 300 according to an embodiment.

Furthermore, the user device 300 may be a device to play a game by a user under the game service providing server 200.

The user device 300 may include a memory 310, a processor 320, a user interface 330, and a communication unit 340.

According to an embodiment, the user device 300 may include a user's PC. Furthermore, the user device 300 is not limited to the user's PC and may include a PC at a different place, for example, a PC café, or a user's mobile device such as a smartphone, a tablet, or a wearable device.

The memory 310, which is a computer-readable recording medium, may include random access memory (RAM), read only memory (ROM), and a permanent mass storage device such as a disc drive. Furthermore, the memory 310 may store an operating system and at least one of program codes, for example, codes to drive a game program driven in a user device. Such software constituent elements may be loaded from a separate computer-readable recording medium from the memory 310 by using a drive mechanism. Such a separate computer-readable recording medium may include a computer-readable recording medium such as a DVD/CD-ROM drive or a memory card. In another embodiment, software constituent elements may be loaded in the memory 310 through the communication unit 340, not in a computer-readable recording medium. For example, at least one program may be loaded in the memory 310 on the basis of a program installed by files provided by developers or the server 20 of FIG. 1 that provides an installation file or a batch file of a game.

According to an embodiment, the processor 320 may execute one or more programs stored in the memory 310 or instructions provided through the communication unit 340. The processor 320 may include a single core, a dual core, a triple core, a quad core, and cores of a multiple thereof. Furthermore, the processor 320 may include a plurality of processors.

According to an embodiment, the user interface 330 may receive a user input. For example, the user interface 330 may receive a user input that requests a security removal.

The user interface 330 may include a key pad, a dome switch, a touch pad (a contact capacitive type, a pressure type resistive film type, an infrared detection type, a surface ultrasonic conduction type, an integral tension measurement type, a piezo effect type, etc.), a jog wheel, or a jog switch, but the disclosure is not limited thereto.

The communication unit 340 may provide a function to allow the user device 300 and the game server 20 of FIG. 1 through a network. For example, a request generated by the processor 320 of the user device 300 according to a program code stored in a recording device such as the memory 310 may be transmitted to the game server 20 under the control of the communication unit 340. Furthermore, control signals, instructions, contents, files, etc. provided by the game server 20 may be received by the user device 300 through the communication unit 340 of the user device 300. For example, the control signals or instructions of the game server 20 may be transmitted to the processor 320 or the memory 310 through the communication unit 340, and contents or files may be loaded in a separate computer-readable recording medium of the user device 300.

The user device 300 may include more constituent elements than the constituent elements of FIG. 3. For example, the user device 300 may further include a display (not shown). The display may include at least one of a liquid crystal display, a thin film transistor-liquid crystal display, an organic light-emitting diode, a flexible display, a 3D display, or an electrophoretic display. When a display and a touch pad forming a layer structure constitute a touch screen, the display may be used as an input device in addition to an output device.

Figure 4:
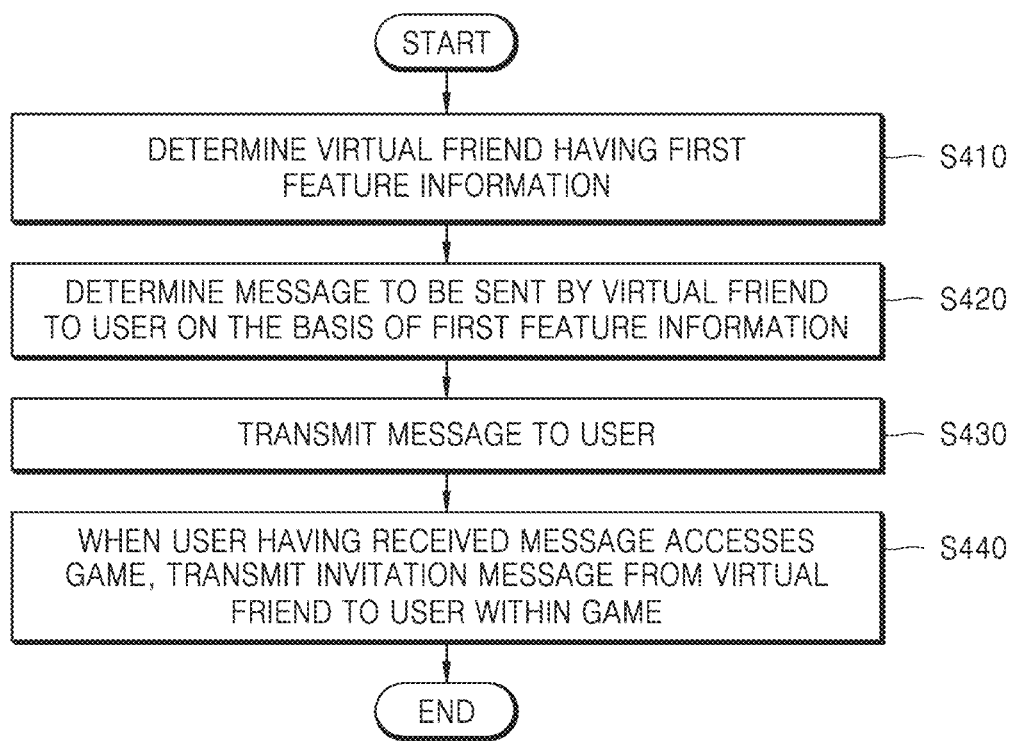
FIG. 4 is a flowchart of a method of providing a game service according to an embodiment.

FIG. 4 is a flowchart of a method of providing a game service according to an embodiment.

The game service providing method of FIG. 4 may support a function of playing a game with a virtual friend.

Furthermore, the game service providing method of FIG. 4 may be performed in the game service providing server 200 of FIG. 2.

In operation S410, the game service providing server 200 may determine a virtual friend having the first feature information (S410). For example, the game service providing server 200 may determine a virtual friend having the first feature information on the basis of the user information.

In operation S420, the game service providing server 200 may determine a message to be sent by a virtual friend to a user on the basis of the first feature information (S420). For example, the game service providing server 200 may determine a message to be sent by a virtual friend to a user on the basis of the user information and the first feature information.

In operation S430, the game service providing server 200 may transmit a message to a user.

In operation S440, when a user who has received the message accesses a game, the game service providing server 200 may transmit an invitation message from a virtual friend to a user within a game.

Figure 5A:
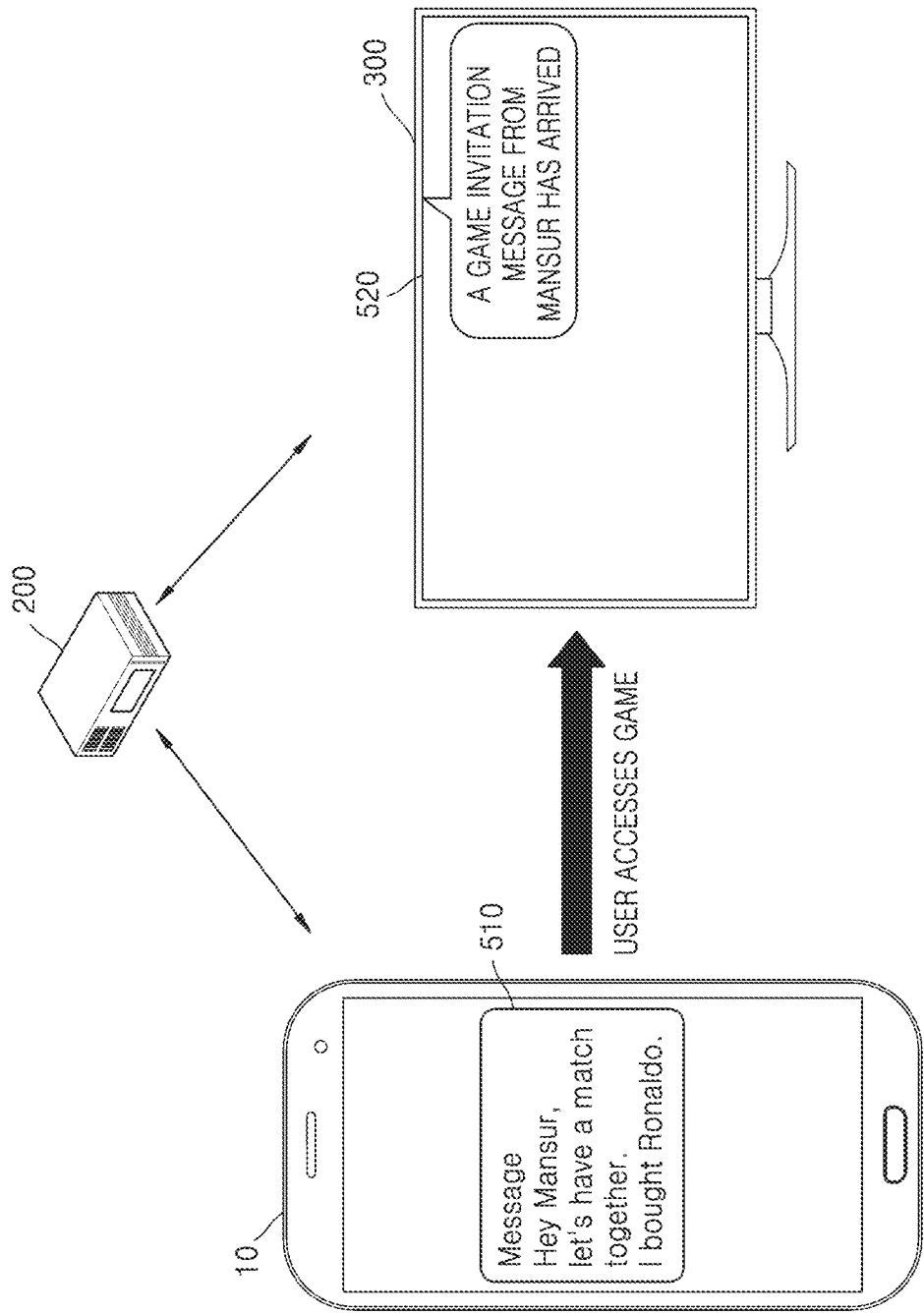
FIG. 5A illustrates that the game service providing server 200 sends an invitation message 520 to the user device 300, according to an embodiment.

FIG. 5A illustrates that the game service providing server 200 sends an invitation message 520 to the user device 300, according to an embodiment.

According to an embodiment, a user who has received a message 510 from a virtual friend through a mobile device 10 may access a game. The message 510 from a virtual friend may be a message determined on the basis of the user information and the first feature information of a virtual friend.

The first feature information of a virtual friend may be generated on the basis of the user information, the first feature information of a virtual friend may be determined according to a model according to an artificial intelligence technology, as described below, and as user information is updated, the first feature information of a virtual friend may be updated as well. For example, as user's game play time is accumulated, and user's level in a game is upgraded, the first feature information of a virtual friend may be updated.

Furthermore, the first feature information may be determined on the basis of the user information and whether a user accepted a match with a virtual friend, and a method of determining the first feature information and a virtual friend having the first feature information is described below.

For example, the message 510 of a virtual friend may be a message determined on the basis of items possessed by a user.

In detail, for example, in a sports online game, when players possessed by a user for a soccer game includes Ronaldo, according to an embodiment, the message 510 of a virtual friend may be a message such as "Hey, let's have a match together. I bought Ronaldo.", which may cause a desire of winning in the user so as to access a game.

When a user who has received the message 510 from a virtual friend accesses a game, the game service providing server 200 may transmit the invitation message 520 from the virtual friend through the user device 300 for playing the game.

The mobile device 10 of FIG. 5A may include not only user's smartphone, tablet PC, or watch that may be authenticated by a device possessed by the user, but also various wearable devices including a communication function and a data processing function.

The user device 300 of FIG. 5A may be a device for actually playing a game by a user.

In this state, the mobile device 10 and the user device 300 may be the same device, and the mobile device 10 of FIG. 5A is illustrated to be different from the user device 300, for convenience of explanation.

According to an embodiment, a database of the game service providing server 200 may store the user device 300 and the mobile device 10 by mapping the user device 300 and the mobile device 10 to be devices according to the same account.

Figure 5B:
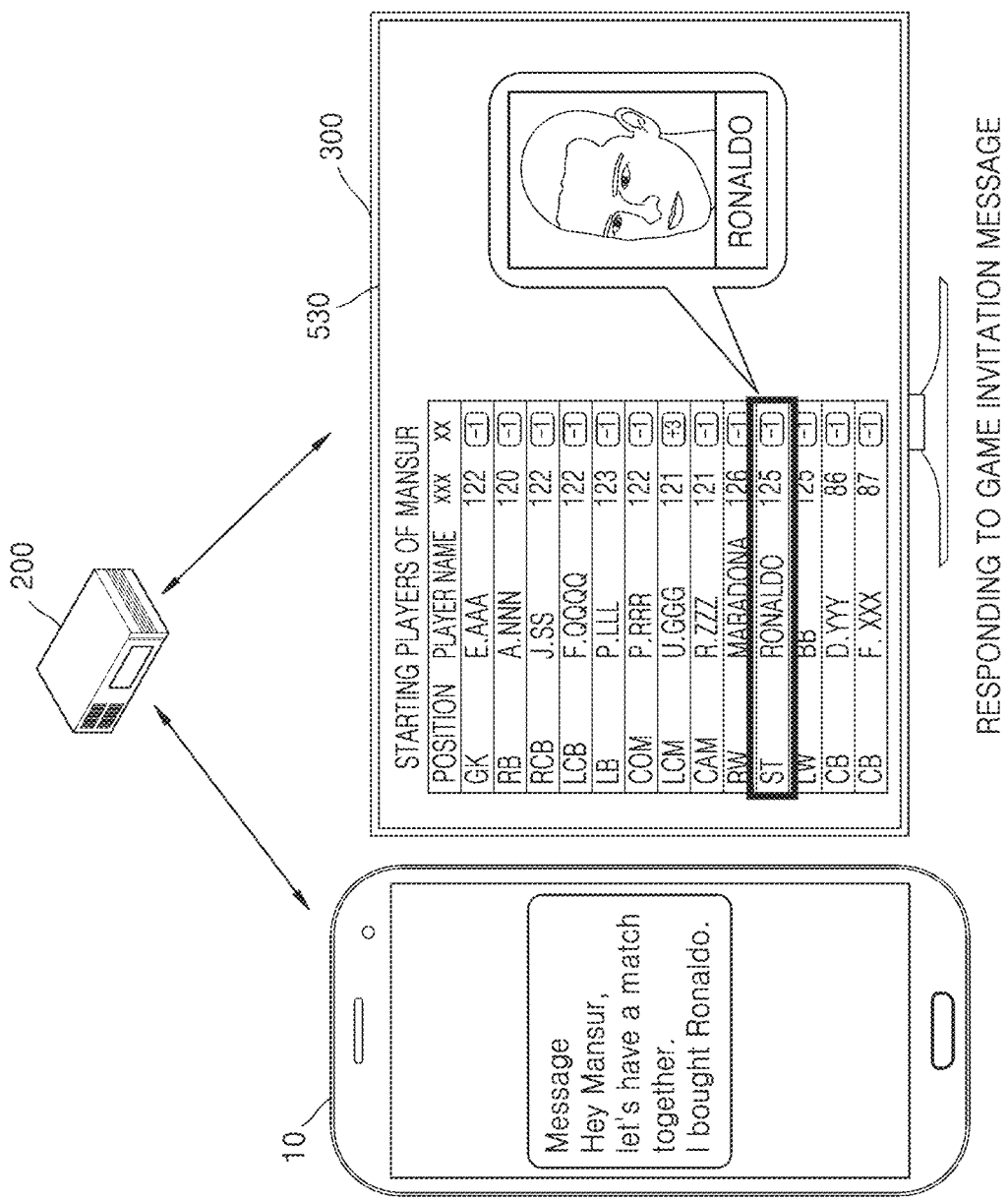
FIG. 5B illustrates that the user who has accepted an invitation in response to the invitation message 520 from a virtual friend accesses and plays a real game with the virtual friend.

FIG. 5B illustrates that the user who has accepted an invitation in response to the invitation message 520 from a virtual friend accesses and plays a real game with the virtual friend.

According to an embodiment, when the message 510 of a virtual friend is a message notifying that a specific item has been purchased, the game service providing server 200 may actually add the purchased item to an item list of a virtual friend.

Referring to FIG. 5B, according to an embodiment, when the message 510 of a virtual friend is a message notifying that a specific item has been purchased as in the message "Hey, let's have a match together. I bought Ronaldo.", as described in FIG. 5A, the game service providing server 200 may actually add Ronaldo to an item list of a virtual friend.

Figure 6:
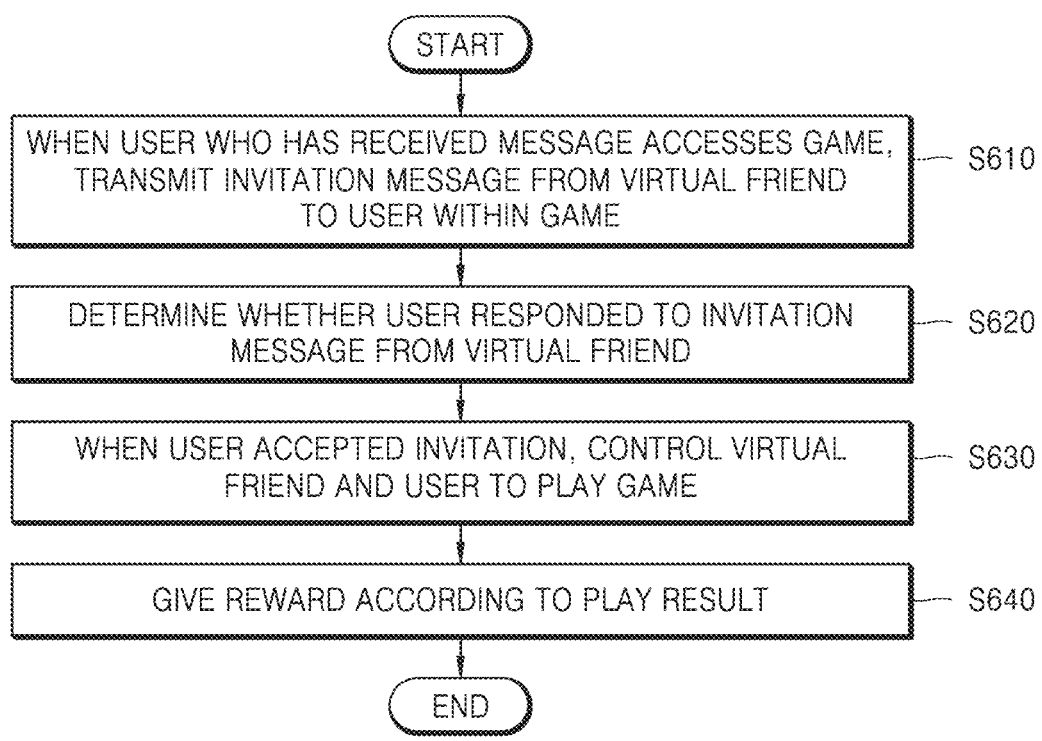
FIG. 6 is a flowchart of a method of providing a game service according to an embodiment.

FIG. 6 is a flowchart of a method of providing a game service according to an embodiment.

The game service providing method of FIG. 6 may support a function of playing a game with a virtual friend. Furthermore, the game service providing method of FIG. 6 may be performed in the game service providing server 200 of FIG. 2 or the user device 300 of FIG. 3.

In operation S610, when a user who has received the message accesses a game, the game service providing server 200 may transmit an invitation message from a virtual friend to a user within a game (S610).

In operation S620, the game service providing server 200 may determine whether the user responded to the invitation message from a virtual friend (S620). In detail, the game service providing server 200 may determine whether the user accepted the invitation according to the invitation message from a virtual friend.

In operation S630, when the user accepted the invitation, the game service providing server 200 may control such that the virtual friend and the user play a game (S630).

In operation S640, the game service providing server 200 may give a reward according to a play result (S640). Furthermore, the game service providing server 200 may control such that the virtual friend give an appropriate advice to the user.

Figure 7A:
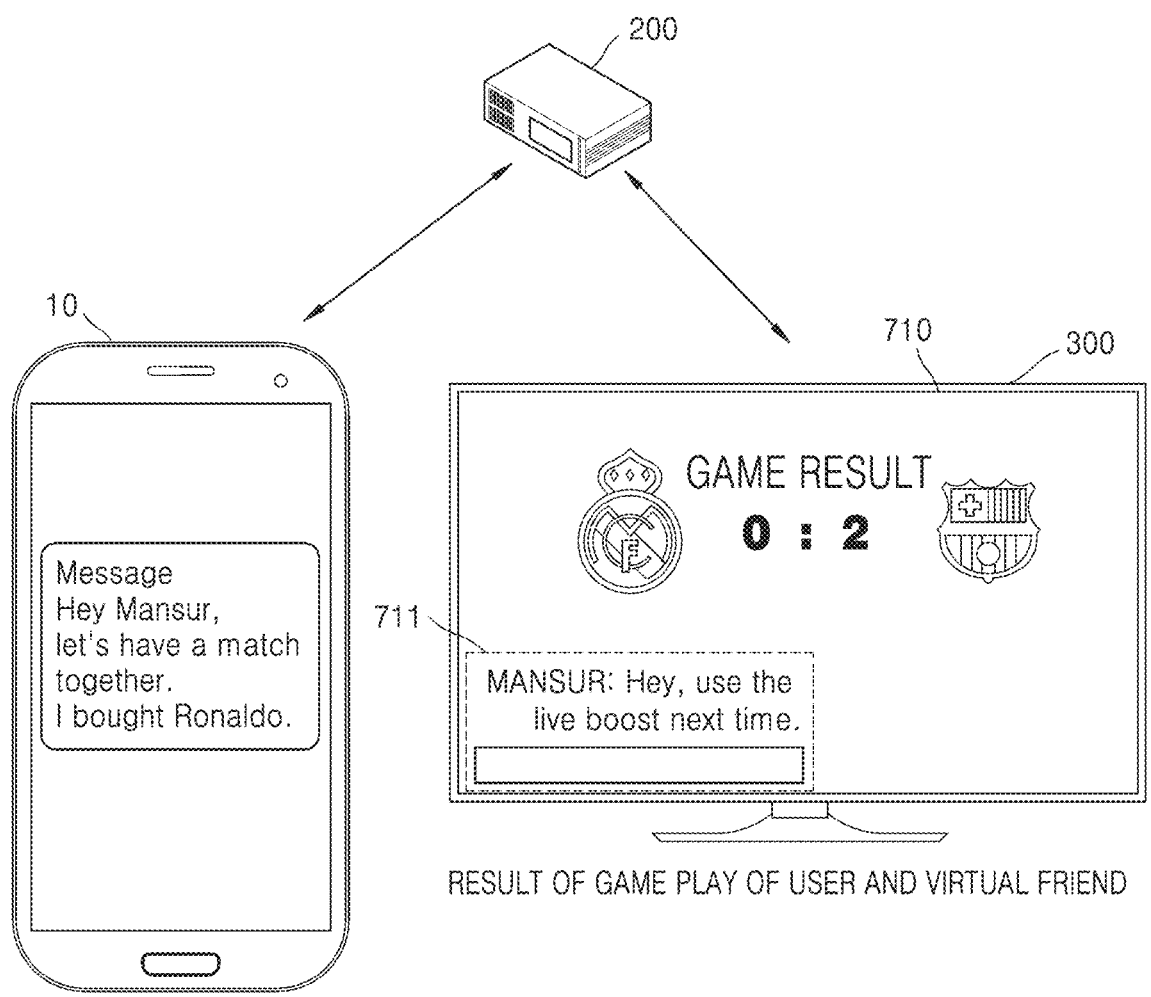
FIG. 7A illustrates a case in which a user accepts an invitation from a virtual friend and completes a game.

FIG. 7A illustrates a case in which a user accepts an invitation from a virtual friend and completes a game.

The game service providing server 200 may display a result screen 710 after the user completes the match with the virtual friend.

The result screen 710 may display a user interface 711 in which, for example, the virtual friend gives an advice to and coaches the user regarding the user's game play. This may have the user feel like having a match with a real friend.

Figure 7B:
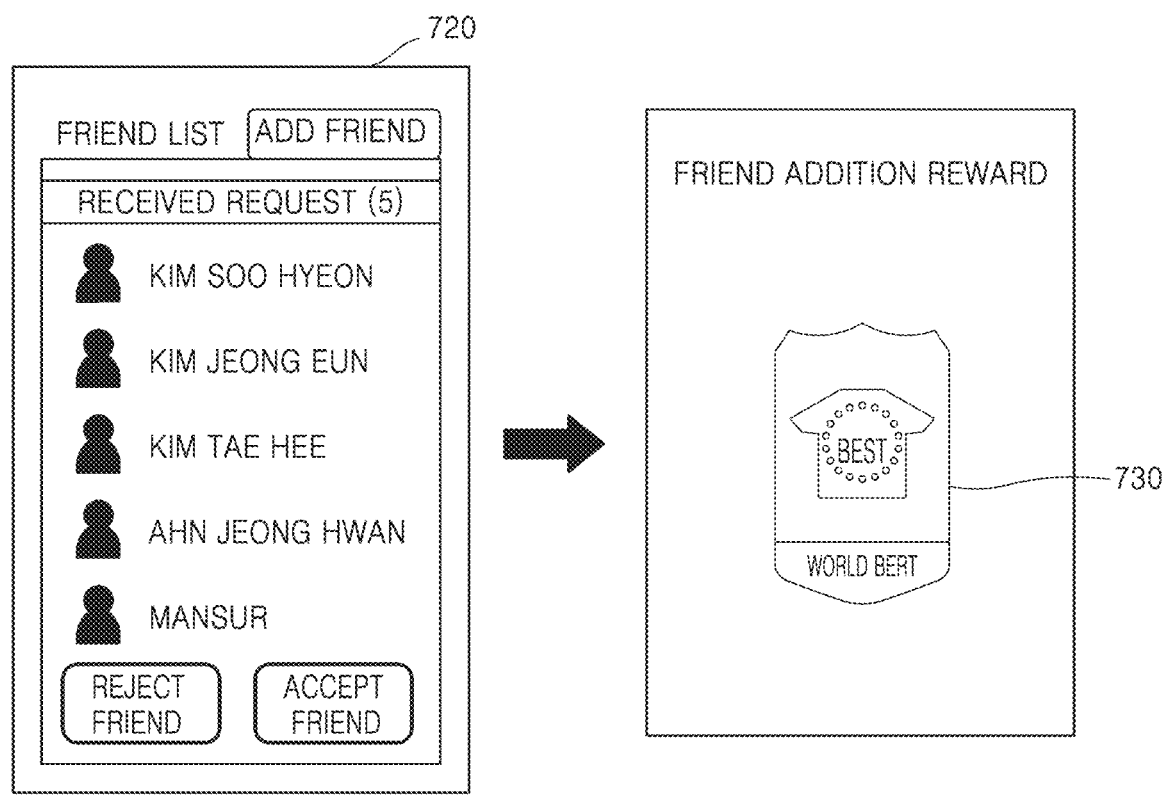
FIG. 7B illustrates that a user is rewarded when the user accepted an invitation from the virtual friend and completed a game.

FIG. 7B illustrates that a user is rewarded when the user accepted an invitation from the virtual friend and completed a game.

For example, FIG. 7B illustrates a user interface 720 to add a friend to a users friend list. When the user adds a virtual friend to a friend list, the game service providing server 200 may give an appropriate reward 730 to the user, thereby increasing interest in a game. Furthermore, the game service providing server 200 may give an appropriate reward to the user when the user completes the match with a virtual friend.

Figure 8:
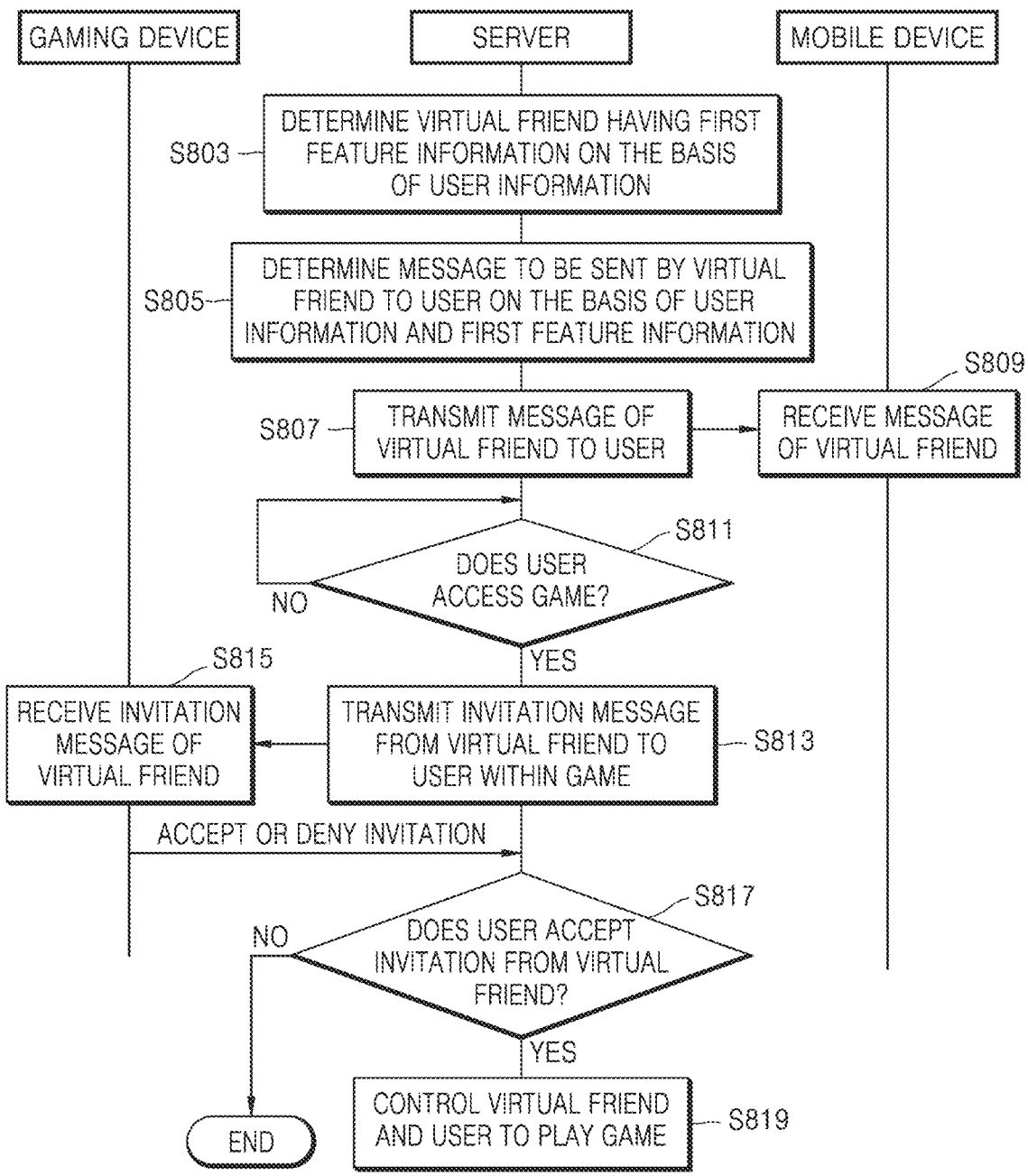
FIG. 8 is a flowchart of a method of providing a game service according to an embodiment.

FIG. 8 is a flowchart of a method of providing a game service according to an embodiment.

A user authentication method of FIG. 8 may be performed in a server that provides a game service to the user, a gaming device, and a mobile device.

The server of FIG. 8 may correspond to the game service providing server 200 of FIG. 2. In the following description, the server, the service providing server, and the game service providing server may be used as the same meaning.

The gaming device of FIG. 8 may correspond to the user device 300 of FIG. 3. Furthermore, the mobile device of FIG. 8 may correspond to the user devices 12 and 14 of FIG. 2 or the user device 300 of FIG. 3.

In operation S803, the game service providing server 200 may determine a virtual friend having the first feature information on the basis of the user information (S803).

In operation S805, the game service providing server 200 may determine a message to be sent by a virtual friend to a user on the basis of the user information and the first feature information (S805).

In operation S807, the game service providing server 200 may transmit a message from the virtual friend to the user (S807).

In operation S809, the mobile device may receive the message from the virtual friend from the game service providing server 200 (S809).

In operation S811, the game service providing server 200 may determine whether the user who has received the message accesses a game (S811).

In operation S813, when it is determined that the user who has received the message accesses the game, the game service providing server 200 may transmit an invitation message from the virtual friend to the user within a game (S813).

In operation S815, the gaming device may receive an invitation message from the virtual friend from the game service providing server 200 (S815).

In operation S817, the game service providing server 200 may determine whether the user accepts an invitation from the virtual friend (S817).

In operation S819, when the user has accepted the invitation from the virtual friend, the game service providing server 200 may control such that the virtual friend and the user play the game (S819). When the user has not accepted the invention from the virtual friend, the game service providing server 200 may end the method of providing a game service.

Figure 9:
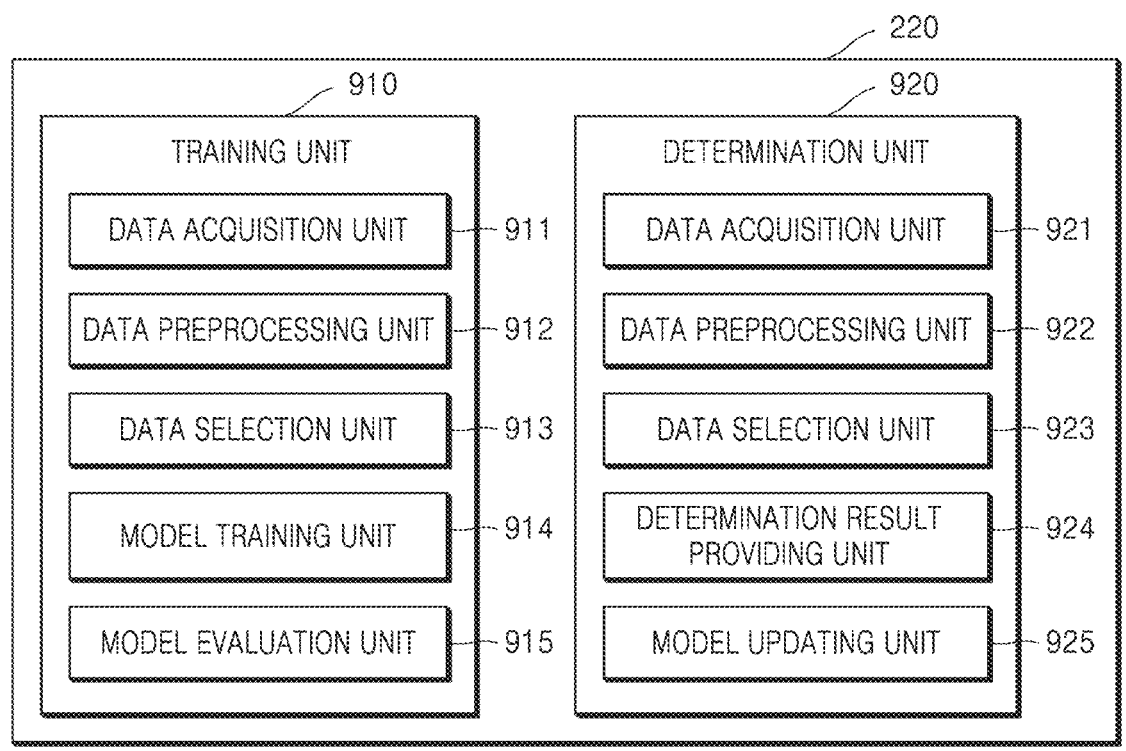
FIG. 9 illustrates a detailed configuration of a processor 220 including a training unit 910 and a determination unit 920, according to an embodiment.

FIG. 9 illustrates a detailed configuration of a processor 220 including a training unit 910 and a determination unit 920, according to an embodiment.

The training unit 910 and the determination unit 920 may be included in the processor 220 of the game service providing server 200 of FIG. 2.

Furthermore, the training unit 910 and the determination unit 920 may be included in a separate processor included in the game service providing server 200. When the training unit 910 and the determination unit 920 are implemented in at least one processor of the same device, the training unit 910 and the determination unit 920 may be connected by a data line or a bus.

The processor 220 may generate a model for determining a virtual friend and a message from the virtual friend by training, through the training unit 910, the user information, information about a virtual friend having feature information, a message from a virtual friend, and whether the user has responded to an invitation message, by using an artificial intelligence algorithm. According to an embodiment, the model may be a model for generating various pieces of data generated during a game of a user and a virtual friend.

The generation of a model by the training unit 910 may include training a model by the training unit 910 or updating a trained model.

The processor 220 may determine, though the determination unit 920, a virtual friend and a message from the virtual friend by using a model generated by the training unit 910. Furthermore, the processor 220 may generate, through the determination unit 920, various pieces of data generated during a game of the user and the virtual friend.

The training unit 910 and the determination unit 920 of FIG. 9 may train and determine data in engagement with each other.

The determination unit 920 may provide a determination result according to the model established in the training unit 910 on the basis of the user information and stored in the database or memory 210 of FIG. 2. The determination unit 920 may update a model by applying to the model data obtained real time during a game between the virtual friend and the user. Furthermore, the determination unit 920 may store the determination result in the memory 210 of FIG. 2 under the control of the processor 220 of FIG. 2.

In FIG. 9, the training unit 910 may include a data acquisition unit 911, a data preprocessing unit 912, a data selection unit 913, a model training unit 914, and a model evaluation unit 915. As an embodiment, the training unit 910 may essentially include the data acquisition unit 911 and the model training unit 914, and may further include or may not include at least one of the data preprocessing unit 912, the data selection unit 913, or the model evaluation unit 915.

The data acquisition unit 911 may acquire data. For example, the data acquisition unit 911 may acquire data related to a user or data related to other users from at least one of a server, for example, the game service providing server 200, an external database, or the user device 300.

The data preprocessing unit 912 may preprocess the acquired data. For example, the data preprocessing unit 912 may process acquired data in a preset format so that the model training unit 914 that is described below uses the acquired data.

The data selection unit 913 may select training data needed for training from among the preprocessed data related to a user. The selected training data may be provided to the model training unit 914. In this case, the data acquired by the data acquisition unit 911 or the data processed by the data preprocessing unit 912 may be provided, as training data, to the model training unit 914.

The model training unit 914 may train a model by using the training data. For example, the model training unit 914 may train a judgment model according to a supervised training method or an unsupervised training method and generate a model set to determine a patient's abnormal state or a patient's normal state. The model training unit 914 may generate the model as a dynamic model to induce prediction, determination, or estimation by using the training data according to a machine training method.

The model training unit 914 may train a data recognition model by using a training algorithm including, for example, an error back-propagation method or a gradient descent method. Furthermore, the model training unit 914 may train a model through supervised training that uses, for example, at least part of the training data, for example, standard information for determining whether a user accessed a game in response to a message from a virtual friend.

In this case, the training data may include data of when a user accesses a game in response to a message from a virtual friend or data of when a user accesses a game at a random time not in response to a message from a virtual friend. Furthermore, the training data may include the standard information including data that indicates whether a user accessed a game in response to a message from a virtual friend game.

The user information may include at least one of game access information, play performance, attack point information, growth information, used item information, obtained item information, level information, completed achievement information, achieved quest information, skill information, operation ability information, friend information, or guild information. Furthermore, the user information may be information obtained by interpreting, on the basis of a certain standard, lots of data such as a group to which a character possessed by a user belongs, an individual skill, a speed, a damage amount, physical strength, an attack participation degree, a defense participation degree, an accumulated wealth amount, a user's accumulated game time, a used item type, and a level.

The model training unit 914 may train the first model for determining first feature information and a virtual friend having the first feature information, by using the user information, information about a virtual friend determined on the basis of the user information, and the standard information indicating whether the user accessed a game in response to a message from the determined virtual friend.

The model training unit 914 may train the second model for determining a message from a virtual friend, by using the user information, the information about a virtual friend determined on the basis of the user information, a message transmitted by a virtual friend to a user, and the standard information indicating whether the user accessed a game in response to a message from the determined virtual friend.

Furthermore, the model training unit 914 may train a model by using together statistics information of a user in a cross game and pieces of data related to other users. For example, the model training unit 914 may train the first model for determining a virtual friend and the second model for determining a message to be transmitted to the virtual friend, by using the statistics information of a user in a cross game, statistics information of a plurality of other users in a game for a certain period or during a certain game play frequency, and standard information indicating whether a user and a plurality of other users accessed a game in response to a message from a virtual friend.

Furthermore, the model training unit 914 may train a model by giving a weight to data having high importance among the user information.

When a judgment model is trained, the model training unit 914 may store the trained data recognition model. In this case, the model training unit 914 may store the trained judgment model in a memory inside or outside the game service providing server 200.

The model evaluation unit 915 may input evaluation data to the trained judgment model, and when a determination result output from the evaluation data does not meet a certain standard, the model training unit 914 may train the model again. In this case, the evaluation data may be preset data to evaluate the judgment model.

At least one of the data acquisition unit 911, the data preprocessing unit 912, the data selection unit 913, the model training unit 914, or the model evaluation unit 915, which are constituent elements of the training unit 910, may be manufactured in the form of at least one hardware chip and mounted in an electronic device. For example, at least one of the data acquisition unit 911, the data preprocessing unit 912, the data selection unit 913, the model training unit 914, or the model evaluation unit 915 may be manufactured in the form of a dedicated hardware chip for artificial intelligence (AI), or may be manufactured as a part of existing general-purpose processor, for example, a CPU or an application processor, or a graphics dedicated processor, for example, a GPU, and mounted on a server device.

Furthermore, at least one of the data acquisition unit 911, the data preprocessing unit 912, the data selection unit 913, the model training unit 914, or the model evaluation unit 915 may be implemented by a software module or a program module including instructions. In this case, the software module may be stored in non-transitory computer-readable media. At least one software module may be provided by an operating system (OS) or by a certain application. Alternatively, part of the at least one software module may be provided by the OS, and the other part thereof may be provided by a certain application.

The determination unit 920 of FIG. 9 may include a data acquisition unit 921, a data preprocessing unit 922, a data selection unit 923, a determination result providing unit 924, and a model updating unit 925. In an embodiment, the determination unit 920 may essentially include the data acquisition unit 921 and the determination result providing unit 924 and may selectively further include at least one of the data preprocessing unit 922, the data selection unit 923, or the model updating unit 925.

The data acquisition unit 921 may acquire data about users who played a game with the virtual friend provided by the game service providing server 200 or received a message from the virtual friend provided by the game service providing server 200.

The data preprocessing unit 922 may preprocess the acquired data. For example, the data preprocessing unit 912 may process the acquired data in a preset format so that the determination result providing unit 924 that is described below uses the acquired data.

The data selection unit 923 may select feature data that is subject to determination, from among the preprocessed data related to a user. The selected feature data may be provided to the determination result providing unit 924. In this case, the data acquired by the data acquisition unit 921 or the data processed by the data preprocessing unit 922 may be provided, as training data, to the determination result providing unit 924.

The data selection unit 923 may select the feature data according to a preset standard. The preset standard may be determined considering at least one of, for example, attributes of data, a creation time of data, a creator of data, reliability of data, an object of data, a creation region of data, or a size of data.

The determination result providing unit 924 may determine a virtual friend or a message from a virtual friend by applying the feature data to the model trained according to the above-described supervised training method or unsupervised training method.

The model updating unit 925 may control the judgment model to be updated on the basis of an evaluation of a determination result provided by the determination result providing unit 924. For example, the model updating unit 925 may control the model training unit 914 to update the judgment model by providing a user feedback regarding the determination result provided by the determination result providing unit 924 to the model training unit 914.

At least one of the data acquisition unit 921, the data preprocessing unit 922, the data selection unit 923, the determination result providing unit 924, or the model updating unit 925, which are the constituent elements of the determination unit 920, may be manufactured in the form of at least one hardware chip and mounted on an electronic device. For example, at least one of the data acquisition unit 921, the data preprocessing unit 922, the data selection unit 923, the determination result providing unit 924, or the model updating unit 925 may be manufactured in the form of a dedicated hardware chip for artificial intelligence, or may be manufactured as part of an existing general-purpose processor or a graphics dedicated processor and mounted on a server device.

Furthermore, at least one of the data acquisition unit 921, the data preprocessing unit 922, the data selection unit 923, the determination result providing unit 924, or the model updating unit 925 may be implemented by a software module or a program module including instructions. In this case, the software module may be stored in non-transitory computer-readable media. The at least one software module may be provided by the OS or by a certain application. Alternatively, part of the at least one software module may be provided by the OS, and the other part thereof may be provided by a certain application.

Figure 10A:
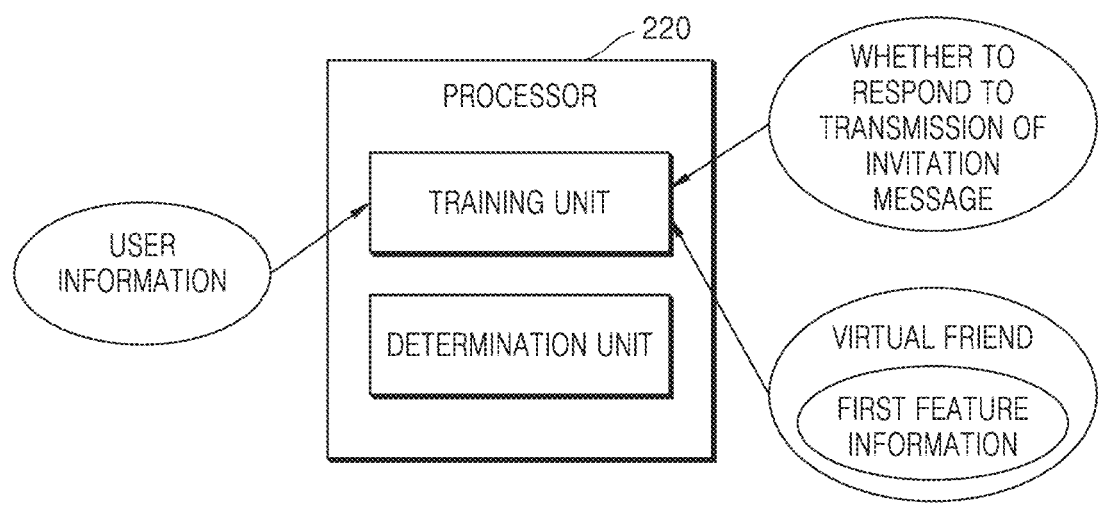
FIG. 10A illustrates that the processor 220 generates a first model for determining a virtual friend by using an artificial intelligence algorithm.

FIG. 10A illustrates that the processor 220 generates a first model for determining a virtual friend by using an artificial intelligence algorithm.

Generating a model may include training a model or updating a trained model.

The processor 220 may train a first model for determining a virtual friend having the first feature information, through the training unit 910, by using the user information, the information about a virtual friend having the first feature information determined on the basis of the user information, and the standard information indicating whether the user accessed a game in response to a message from the determined virtual friend.

According to an embodiment, the first model may be a model for generating various pieced of data generated during a game with the virtual friend, in addition to the first feature information and the virtual friend having the first feature information.

Figure 10B:
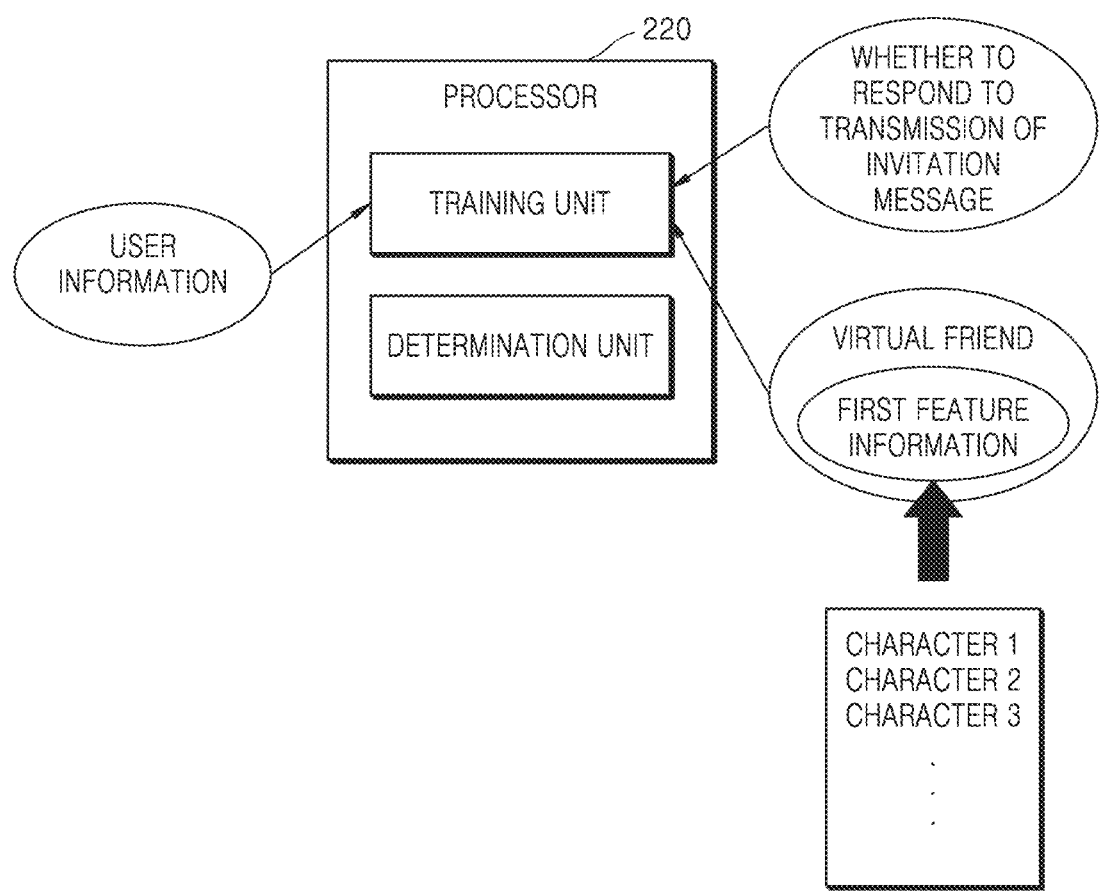
FIG. 10B illustrates that the processor 220 generates a virtual friend by using the first model.

FIG. 10B illustrates that the processor 220 generates a virtual friend by using the first model.

The processor 220 may determine a virtual friend by applying the user information to the first model through the determination unit 920.

The virtual friend may be a friend first generated according to the selected first feature information from, for example, character 1, character 2, and character 3. Furthermore, the first feature information of a virtual friend may be updated by using the first model.

In FIG. 10B, for example, the user information may include a user's level, user item information, obtained item information, and a user's accumulated wealth amount.

In this case, the virtual friend determined by the processor 220 using the first model through the determination unit 920 may have a level similar to the level of a user, have an item having a similar performance to the item used by the user, and possess wealth similar to a user's accumulated wealth amount. Furthermore, for example, the first feature information determined through the first model may include a feature that induces or recommends purchase of a character that is not possessed by the user.

In another example, the user information may include game access information of a user.

In this case, the virtual friend determined by the processor 220 using the first model through the determination unit 920 may be a virtual friend having the first feature information who accesses at a similar time slot when the user accesses. Furthermore, for example, when a user did not access at a time slot when the user usually accessed, the first feature information determined through the first model may include a feature of transmitting a message.

When a user plays a game with a virtual friend having a character determined according to the user information, the user may have interest greater than in a case in which the user plays the game alone, thereby having an effect that the user continuously plays the game. Furthermore, the user may have much greater interest when the user plays again with a virtual friend with whom the user played the game previously.

Figure 11A:
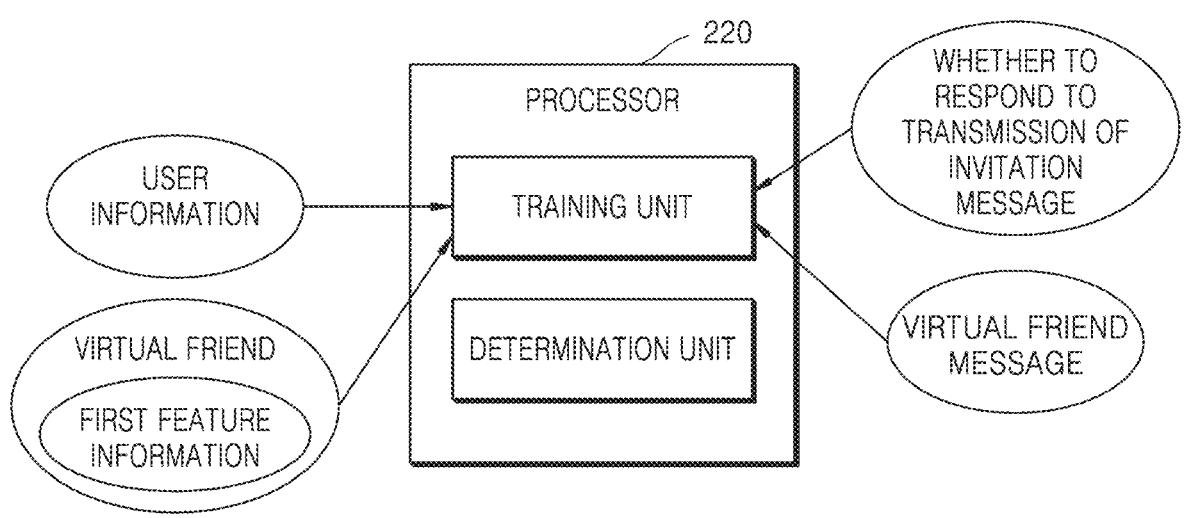
FIG. 11A illustrates that the processor 220 generates a second model for determining a message from a virtual friend by using the artificial intelligence algorithm.

FIG. 11A illustrates that the processor 220 generates a second model for determining a message from a virtual friend by using the artificial intelligence algorithm.

The processor 220 may train the second model for determining a message from a virtual friend by using, through the training unit 910, the user information, a virtual friend generated on the basis of the user information, a message from a virtual friend that the user received, and standard information indicating whether the user accessed a game in response to the message from the virtual friend.

Figure 11B:
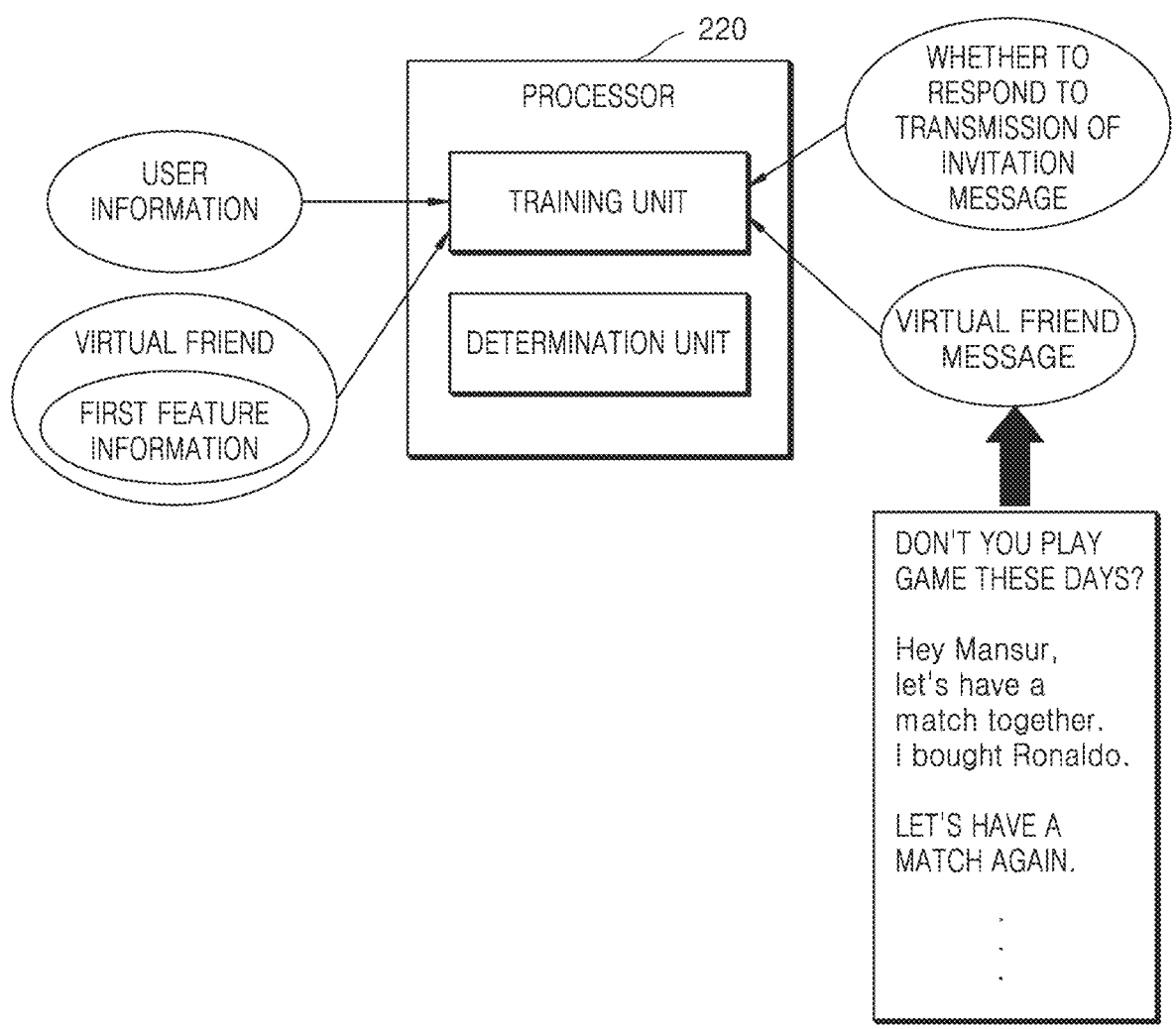
FIG. 11B illustrates that the processor 220 generates a message from a virtual friend by using the second model.

FIG. 11B illustrates that the processor 220 generates a message from a virtual friend by using the second model.

The processor 220 may determine a message from a virtual friend by applying, through the determination unit 920, the user information and the virtual friend having the first feature information to the second model.

For example, the user information may include a user's level, used item information, obtained item information, and a user's accumulated wealth amount.

In this case, a message from a virtual friend determined by the processor 220 using the second model, through the determination unit 920, may be a message that the user purchased an item that the user wanted to possess and thus added to a shopping basket or a message that induces or recommends purchase of a character that is not possessed by the user.

In another example, the user information may include game access information of a user.

In this case, a message from a virtual friend that is determined by the processor 220 by using the second model, through the determination unit 920, may be transmitted at a time slot when the user usually accesses and may include a message that induces a user's access, wants a rematch with the user, or asks user's safety, according to a user's access frequency.

Accordingly, as the virtual friend sends a message to invite a user to a match or to guide the user to play together, the user may feel the virtual friend like a real friend virtual friend, and thus the user may be induced to participate in a game by causing user's desire of winning.

The above-described device may be implemented by a hardware constituent element, a software constituent element, and/or a combination of a hardware constituent element and a software constituent element. For example, the device and constituent elements described in the embodiments may be implemented by using one or more general-purpose computers or special purpose computers, for example, a processor, a controller, an arithmetic logic unit (ALU), a digital signal processor, a microcomputer, a field programmable gate array (FPGA), a programmable logic unit (PLU), a microprocessor, or other device capable of executing and responding instructions. A processing device may perform on the OS and one or more software applications performed on the OS. Furthermore, the processing device, in response to the execution of software, may access, store, manipulate, process, and generate data. For convenience of understanding, although one processing device is described to be used as the processing device, one skilled in the art may understand that the processing device includes a plurality of processing elements and/or multiple types of processing elements. For example, the processing device may have a plurality of processors or a single processor and a single controller. Furthermore, other processing configuration such as a parallel processor may be configured herein.

The software may include a computer program, a code, an instruction, or a combination of one or more thereof, and the software may configure a processing device so that the processing device can be operated as intended, or may independently or collectively command the processing device. In order to be interpreted by the processing device or in order to provide instructions or data to the processing device, the software and/or data may be permanently or temporarily embodied in any type of machine, a component, physical equipment, virtual equipment, a computer storage medium or device, or a transmitted signal wave. As the software is distributed on a computer system connected to a network, the software may be stored or executed in a distribution method. The software and data may be stored in one or more computer-readable recording media.

The method according to the embodiment may be realized in a program command format that may be executed by using various computing means, so as to be recorded in a computer-readable medium. The computer-readable medium may independently or collectively include a program command, a data file, a data structure, and so on. The program command being recorded in the medium may correspond to a program command that is specifically designed and configured for the embodiments, or may correspond to a program command that is disclosed and available to one skilled in the art related to computer software. Examples of the computer-readable recording medium may include magnetic media, such as hard discs, floppy discs, and magnetic tapes, optical media, such as CD-ROMs, DVDs, and so on, magneto-optical media, such as floptical discs, and hardware devices specially configured for storing and executing program commands, such as ROMs, RAMs, flash memories, and so on. An example of a computer program may include not only machine codes created by a compiler but also high-level programming language executable by a computer using an interpreter. The above-described hardware apparatuses may be configured to operate as one or more software modules to perform operations according to various embodiments of the disclosure, or vise versa.

Although exemplary embodiments of the disclosure have been described for illustrative purposes, those having ordinary knowledge in the technical field of the disclosure will appreciate that various modifications, additions and substitutions are possible. For example, when the above-described technologies are performed in an order different from the above-described method, and/or the above-described constituent elements such as a structure, a device, or a circuit are coupled to or combined with each other in a different form from the above-described method, or replaced or substituted with other constituent elements or equivalents, an appropriate result may be achieved.

Thus, other implementations, other embodiments, and equivalents to claims belong to the scope of the claims described below.

The invention claimed is:

1. A method of enabling a user to play a game with a virtual friend, the method comprising:
   determining, by a processor of a computing device, a virtual friend comprising a computer generated friend having a virtual personality, the virtual friend having first feature information, wherein determining the virtual friend comprises inputting user information associated with a user into a first model that comprises a first artificial intelligence algorithm trained with other user information to determine the virtual friend and the first feature information;
   determining, by the processor, a message from the virtual friend to be transmitted to the user on a basis of the first feature information, wherein determining the message comprises inputting the user information and the first feature information into a second model that comprises a second artificial intelligence algorithm trained with the other user information and other feature information to determine the message;
   transmitting, by the processor and via a communication unit of the computing device, the message to the user; and
   in response, when the user who has received the message accesses a game, transmitting, by the processor and via the communication unit, an invitation message from the virtual friend to the user within the game.

2. The method of claim 1, wherein the user information comprises at least one of game access information, play performance, attack point information, growth information, used item information, obtained item information, level information, completed achievement information, achieved quest information, skill information, operation ability information, friend information, or guild information.

3. The method of claim 1, wherein the determining of the virtual friend having the first feature information comprises determining the virtual friend having the first feature information on a basis of the user information and game statistics information, and
   the game statistics information comprises at least one of statistics information of a new user in a game test version, statistics information of the new user in a cross game, and statistics information of a plurality of other users for a certain period or for a certain game play frequency in a game.

4. The method of claim 1, wherein the determining of the virtual friend having the first feature information comprises determining the first virtual friend having the first feature information and a second virtual friend having second feature information on a basis of the user information.

5. The method of claim 1, wherein the first model is a model generated by training, by using the first artificial intelligence algorithm, the user information and information about whether the user and the virtual friend play a game in response to the transmitting of the invitation message.

6. The method of claim 1, wherein the determining of the virtual friend having the first feature information comprises selecting at least one virtual friend from among virtual friends included in a user's friend list on a basis of user information.

7. The method of claim 1, wherein the determining of the message from the virtual friend to be transmitted to the user on a basis of the first feature information comprises determining a message requesting a match with the user on a basis of user information and the first feature information.

8. The method of claim 1, wherein the second model is a model generated by training, by using the second artificial intelligence algorithm, the user information, the first feature information, and information about whether the user and the virtual friend play a game in response to the transmission of the invitation message.

9. The method of claim 1, wherein the transmitting of the message to the user comprises transmitting the message to the user at a time determined on a basis of user information and the first feature information.

10. The method of claim 1, further comprising controlling the virtual friend having the first feature information and the user to play the game in response to the invitation message from the virtual friend.

11. A device for enabling a user to play a game with a virtual friend, the device comprising
   a memory;
   a processor; and
   a communication unit, wherein the processor is configured to:
      determine a virtual friend comprising a friend having a virtual personality generated by the device, having first feature information, wherein determining the virtual friend comprises inputting user information associated with a user into a first model that comprises a first artificial intelligence algorithm trained with other user information to determine the virtual friend and the first feature information,
      determine a message from the virtual friend to be transmitted to the user on a basis of the first feature information, wherein determining the message comprises inputting the user information and the first feature information into a second model that comprises a second artificial intelligence algorithm trained with the other user information and other feature information to determine the message,
      transmit the message to the user, and
      in response, when the user who has received the message accesses a game, transmit the invitation message from a virtual friend to the user within the game.

12. The device of claim 11, wherein the user information comprises at least one of game access information, play performance, attack point information, used item information, obtained item information, level information, completed achievement information, achieved quest information, skill information, operation ability information, friend information, or guild information.

13. The device of claim 11, wherein the processor is further configured to determine the virtual friend having the first feature information on a basis of the user information and game statistics information, and
   the game statistics information comprises at least one of statistics information of a new user in a game test version, statistics information of the new user in a cross game, and statistics information of a plurality of other users for a certain period or for a certain game play frequency in a game.

14. The device of claim 11, wherein the virtual friend is a first virtual friend and the processor is further configured to determine the first virtual friend having the first feature information and a second virtual friend having the second feature information on a basis of the user information.

15. The device of claim 11, wherein the first model is a model generated by training, by using the first artificial intelligence algorithm, the user information and information about whether the user and the virtual friend play a game in response to the transmission of the invitation message.

16. The device of claim 11, wherein the processor is further configured to select at least one virtual friend from among virtual friends included in a user's friend list on a basis of user information.

17. The device of claim 11, wherein the processor is further configured to determine a message requesting a match with the user on a basis of user information and the first feature information.

18. The device of claim 11, wherein
the second model is a model generated by training, by using the second artificial intelligence algorithm, the user information, the first feature information, and information about whether the user and the virtual friend play a game in response to the transmission of the invitation message.

19. The device of claim 11, wherein the processor is further configured to transmit the message to the user at a time determined on a basis of user information and the first feature information.

20. The device of claim 11, wherein the processor is further configured to controls the virtual friend having the first feature information and the user to play the game in response to the invitation message from the virtual friend.

21. A computer program stored in a computer-readable medium to execute the method according to claim 1.

22. The method of claim 1, wherein the message is part of a conversation between the user and the virtual friend that simulates an interaction between the user and an actual human friend.

* * * * *